A. SWANSON.
NUT LOCK.
APPLICATION FILED MAR. 12, 1907.
909,706.
Patented Jan. 12, 1909.
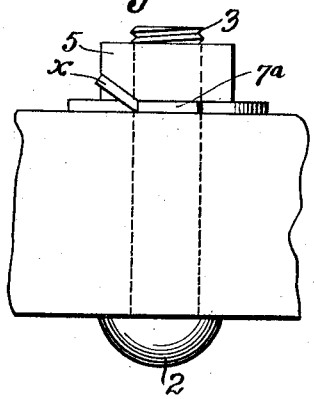
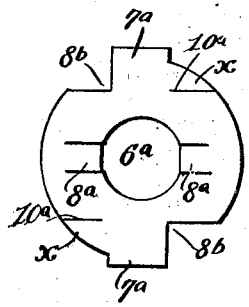
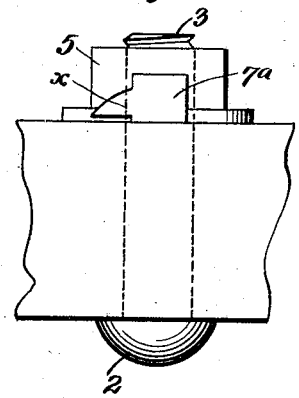
Witnesses
William C. Linton.
Inventor
Albin Swanson
By Victor J. Evans
Attorney

UNITED STATES PATENT OFFICE.

ALBIN SWANSON, OF MOLINE, ILLINOIS.

NUT-LOCK.

No. 909,706.     Specification of Letters Patent.     Patented Jan. 12, 1909.

Application filed March 12, 1907. Serial No. 362,011.

*To all whom it may concern:*

Be it known that I, ALBIN SWANSON, a citizen of the United States of America, residing at Moline, in the county of Rock Island and State of Illinois, have invented new and useful Improvements in Nut-Locks, of which the following is a specification.

This invention relates to nut locks, and one of the principal objects of the same is to provide a lock of simple construction which will securely hold a nut upon a bolt.

Another object of this invention is to provide a nut lock of simple construction which will prevent the nut from turning off the bolt, providing means for temporarily holding the nut on the bolt when it is required to further adjust the nut on the bolt or under conditions which require frequent adjustment of the nut upon the bolt.

These and other objects may be attained by means of the construction illustrated in the accompanying drawings, in which:—

Figure 1 is a side elevation of a bolt showing the application of the present nut lock thereto. Fig. 2 is a plan view of the nut lock. Fig. 3 is a view similar to Fig. 1 showing the nut lock in position to permanently hold a nut.

Referring now more particularly to the drawing, the locking device consists of a washer having a bolt-receiving opening $6^a$ therein, lugs or tongues $8^a$ and oppositely extending lips $7^a$, each having formed at one side thereof an auxiliary locking tongue $x$. In using the washer, the tongue $x$ may be bent up against the side of the nut in cases where frequent adjustments of the nut are desirable, and when the nut is fully adjusted and is required to be locked permanently in place, the lips $7^a$ are bent upward on the line of the slit $10^a$, as shown in Fig. 3. From the construction it will be seen that said lips $7^a$ lie in the plane of the body portion of the washer when the tongues $x$ are bent to engage the faces of a nut to temporarily lock said nut. The bolt is of the usual construction and is provided at one end with a threaded portion 3 to receive the usual nut 5, and at the other end the said bolt is provided with a head 2.

From the foregoing it will be noted that my nut locking device is of simple construction, and serves to lock the nut firmly upon the bolt, and to hold the washer firmly in position locked to the material through which the bolt is passed, the latter being accomplished by reason of the fact that the tongues $8^a$ can be bent downwardly to engage suitable recesses in the material with which a bolt is engaged. The construction is such that the tongues $x$ lie, as shown in Fig. 1 at an obtuse angle to the plate when in an operative position so that they will yield during the rotation of the nut and lie in the path of movement of the same, to allow the said nut to travel without having to manually depress the tongues. By forming the plate in the manner shown it is obvious that substantially V-shaped notches $8^b$ are provided so that the lips $7^a$ can be conveniently manipulated.

It has been discovered, that in machines or like places where bolts are employed, the vibration of the machine parts is such that a nut would in time work away from the surface of the material with which its bolt is engaged, incident to the compression of the material, due to longitudinal movement of the bolt. By providing the tongues $x$ it will be seen that when they are bent to lie at an angle with respect to the washer they lie directly in the path of movement of a nut so that they may engage two of its faces. This action will hold a nut against rotation for considerable time, and when the material with which a bolt is engaged has become compressed, the lips $7^a$ are bent outwardly at right angles to permanently and positively engage two faces of a nut.

I claim:—

As an article of manufacture, a nut locking washer having a centrally located bolt receiving opening, washer locking tongues located at the sides of the opening, oppositely disposed nut locking lips extending laterally from the body portion of the washer adapted to normally lie in the plane with the said body portion of said washer and adapted to be bent at right angles to said body portion to be positively engaged with two faces of a nut, and tongues carried by said lips adapted to be bent at an angle to the body portion of the washer while the lips remain in the plane of the body portion of said washer to lie directly in the path of movement of a nut to engage two of its faces.

ALBIN SWANSON.

Witnesses:
    AUGUST LINK,
    GEORGE E. LANDU.